United States Patent
Lin et al.

(10) Patent No.: US 8,976,159 B2
(45) Date of Patent: Mar. 10, 2015

(54) VARIABLE SIZE SENSING SYSTEM AND METHOD FOR REDEFINING SIZE OF SENSING AREA THEREOF

(75) Inventors: Cho-Yi Lin, Hsinchu (TW); Hsin-Chi Cheng, Hsinchu (TW); Chih-Hung Lu, Hsinchu (TW); Yi-Hsien Ko, Hsinchu (TW)

(73) Assignee: Pixart Imaging Inc., Hsinchu (TW)

( * ) Notice: Subject to any disclaimer, the term of this patent is extended or adjusted under 35 U.S.C. 154(b) by 530 days.

(21) Appl. No.: 12/479,836

(22) Filed: Jun. 7, 2009

(65) Prior Publication Data

US 2010/0156820 A1    Jun. 24, 2010

(30) Foreign Application Priority Data

Dec. 22, 2008   (TW) ............................... 97150146 A

(51) Int. Cl.
*G06F 3/041*    (2006.01)
*G06F 3/042*    (2006.01)

(52) U.S. Cl.
CPC .................................... *G06F 3/0421* (2013.01)
USPC ......................................... 345/178; 345/173

(58) Field of Classification Search
CPC ..... G06F 3/0325; G06F 3/042; G06F 3/0421; G06F 3/0428
USPC ........................... 345/156–158, 162, 173–178
See application file for complete search history.

(56) References Cited

U.S. PATENT DOCUMENTS

| | | | | |
|---|---|---|---|---|
| 5,430,665 | A * | 7/1995 | Jin et al. | 702/163 |
| 6,335,724 | B1 * | 1/2002 | Takekawa et al. | 345/173 |
| 2001/0019325 | A1 * | 9/2001 | Takekawa | 345/157 |
| 2002/0162949 | A1 * | 11/2002 | Iwamoto et al. | 250/221 |
| 2002/0163505 | A1 * | 11/2002 | Takekawa | 345/173 |
| 2003/0133089 | A1 * | 7/2003 | Kobayashi et al. | 355/55 |
| 2005/0023448 | A1 | 2/2005 | Ogawara et al. | |
| 2005/0156900 | A1 * | 7/2005 | Hill et al. | 345/173 |
| 2008/0291164 | A1 | 11/2008 | Tanaka | |

FOREIGN PATENT DOCUMENTS

| | | |
|---|---|---|
| JP | 2001249762 A | 9/2001 |
| JP | 2008-052366 A | 3/2008 |
| TW | M338402 U | 8/2008 |
| WO | WO0157635 A1 | 8/2001 |

* cited by examiner

*Primary Examiner* — Jonathan Horner
(74) *Attorney, Agent, or Firm* — Chun-Ming Shih

(57) ABSTRACT

In a variable size sensing system and a method for redefining the size of a sensing area thereof, the sensing system includes four elements, a mark and two image sensing devices. The four elements are consecutively connected and thereby forming a frame. Two of the four elements have variable lengths so as to adjust the size of the frame. The inner edge of the frame defines a sensing area of a parallelogram shape. The sensing system has a first and a second working mode. The sensing area has a first size and a second size when the sensing system is in the first working mode and the second working mode respectively, wherein the first size is predetermined and smaller than the second size. The mark is used to mark a fixed length. When the sensing system is changed from the first working mode to the second working mode, the mark sensed by the image sensing devices can be utilized to redefine the size of the sensing area in the sensing system.

25 Claims, 13 Drawing Sheets

VARIABLE SIZE SENSING SYSTEM AND METHOD FOR REDEFINING SIZE OF SENSING AREA THEREOF

This application claims the priority benefit of Taiwan application serial no. 097150146, filed on Dec. 22, 2008.

BACKGROUND

1. Field of the Invention

The present invention relates to position sensing technology and more specifically to a variable size sensing system and a method for redefining the size of a sensing area thereof.

2. Description of Related Art

Referring to FIG. 1, a conventional sensing system 100 includes a panel 110, image sensing devices 120 and 130, and a processing circuit 140. The panel 110 includes a touch surface 112, and the shape of the touch surface 112 is a rectangle. The image sensing devices 120 and 130 are located at different corners of the touch surface 112 yet along a same boundary thereof so that the sensing ranges of the image sensing devices 120 and 130 respectively cover the touch surface 112. The image sensing devices 120 and 130 are both connected to the processing circuit 140.

When a pointer 150 touches the touch surface 112 or is placed in the proximity thereof, the image sensing devices 120 and 130 can respectively sense the pointer 150 along the sensing lines 162 and 164. Thus, the processing circuit 140 can identify the sensing lines 162 and 164 from the images that the image sensing devices 120 and 130 sense, and calculate the positional coordinates of the pointer 150 according to the two sensing lines so as to complete sensing the position of the pointer 150.

However, since the image sensing devices 120 and 130 are fixed onto or embedded into the panel 110, the distance between the two image sensing devices is fixed. Once the size of the panel 110 is chosen, the sensing area in which a user can input coordinates is fixed and there is no way to change it.

BRIEF SUMMARY

The present invention relates to a variable size sensing system, wherein the size of sensing area can be redefined and adjusted.

The present invention further relates to a method for redefining the size of the sensing area of the above mentioned variable size sensing system.

A preferred embodiment of the present invention provides a variable size sensing system including a first element, a second element, a third element, a fourth element, two image sensing devices and a mark. The first, second, third and fourth elements are consecutively connected and thereby forming a frame. The first element and the third element are capable of increasing their lengths in a predetermined direction so that the size of the frame can be adjusted. The inner edge of the frame defines a sensing area that has a parallelogram shape. Surfaces of the second, the third and the fourth elements facing the sensing area are applied with a reflective material. The two image sensing devices are respectively disposed at the two ends of the first element and staying at two different corners of the sensing area so that the sensing ranges of the image sensing devices cover the sensing area. The mark is disposed on a surface of the third element facing the sensing area and apart from the fourth element by a fixed distance.

In another preferred embodiment of the present invention, another variable size sensing system including a first element, a second element, a third element, a fourth element, two image sensing devices and a mark. The first, second, third and fourth elements are consecutively connected and thereby forming a frame. The second element and the fourth element are capable of increasing their lengths in a predetermined direction so that the size of the frame can be adjusted, the predetermined direction being the direction departing from the first element. The inner edge of the frame defines a sensing area that has a parallelogram shape. Surfaces of the second, the third and the fourth elements facing the sensing area are applied with a reflective material. The two image sensing devices are respectively disposed at the two ends of the first element and staying at two different corners of the sensing area so that the sensing ranges of the image sensing devices cover the sensing area. The mark is disposed on a surface of the fourth element facing the sensing area and apart from the first element by a fixed distance.

In yet another embodiment of the present invention, a method for redefining the size of a sensing area of a variable size sensing system is provided. The sensing system includes a first element, a second element, a third element and a fourth element, the four elements being consecutively connected and thereby forming a frame. The first element and the third element are capable of increasing their lengths in a predetermined direction so that the size of the frame is adjusted. The inner edge of the frame defines a sensing area that has a parallelogram shape. Surfaces of the second, the third and the fourth elements facing the sensing area are applied with a reflective material. The sensing system further having a mark disposed on a surface of the third element facing the sensing area and apart from the fourth element by a fixed distance. The method includes: changing the sensing system from a first working mode to a second working mode so that the size of the sensing area changes from a predetermined first size to a larger second size; and calculating the change in the length of the third element between the first working mode and the second working mode so as to redefine the size of the sensing area.

In still another embodiment of the present invention, another method for redefining the size of a sensing area of a variable size sensing system is provided. The sensing system includes a first element, a second element, a third element and a fourth element, the four elements being consecutively connected and thereby forming a frame. The second element and the fourth element are capable of increasing their lengths in a predetermined direction so that the size of the frame is adjusted, the predetermined direction being the direction departing from the first element. The inner edge of the frame defines a sensing area that has a parallelogram shape. Surfaces of the second, the third and the fourth element facing the sensing area are applied with a reflective material. The sensing system further has a mark disposed on a surface of the fourth element facing the sensing area and apart from the first element by a fixed distance. The method includes changing the sensing system from a first working mode to a second working mode so that the size of the sensing area changes from a predetermined first size to a larger second size; and calculating the change in the length of the fourth element between the first working mode and the second working mode so as to redefine the size of the sensing area.

In the embodiments of the present invention, the sensing system includes four elements, a mark and two image sensing devices. The four elements are consecutively connected and thereby forming a frame. Two of the four elements have variable lengths so as to adjust the size of the frame. The inner edge of the frame defines a sensing area of a parallelogram shape. The sensing system has a first and a second working mode. The sensing area has a first size and a second size when the sensing system is in the first working mode and the second working mode respectively, wherein the first size is predetermined and smaller than the second size. The mark is used to mark a fixed length and the image sensing devices are adjusted in position according to the working mode the sensing system is in. When the sensing system is changed from the first working mode to the second working mode, the size of the sensing area changes from the first size to the second size, the mark sensed by the image sensing devices can be utilized to redefine the size of the sensing area in the sensing system. Hence, the size of the sensing area can be redefined according to the adjustment of the working mode of the sensing system so that the size of the area available for a user to input coordinates can be changed according to the specific demand of the user.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
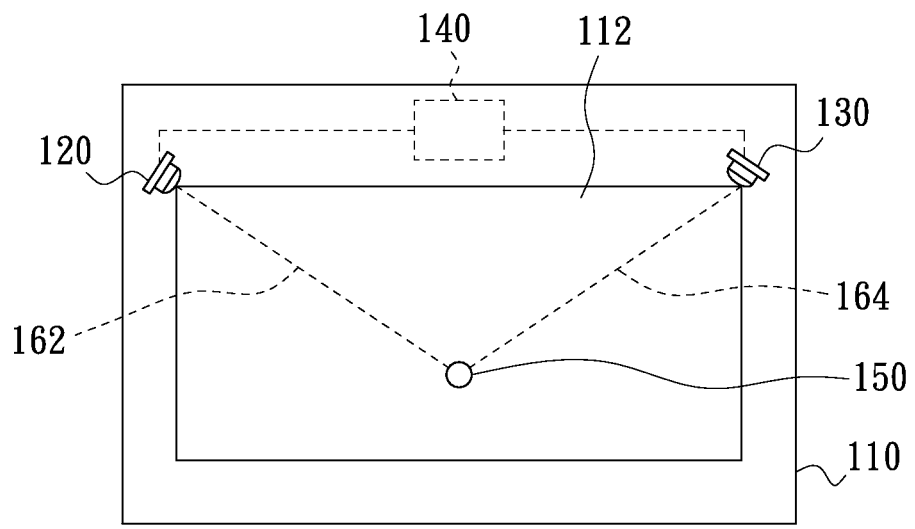
FIG. 1 is a schematic view of a conventional sensing system.
Figure 2A:
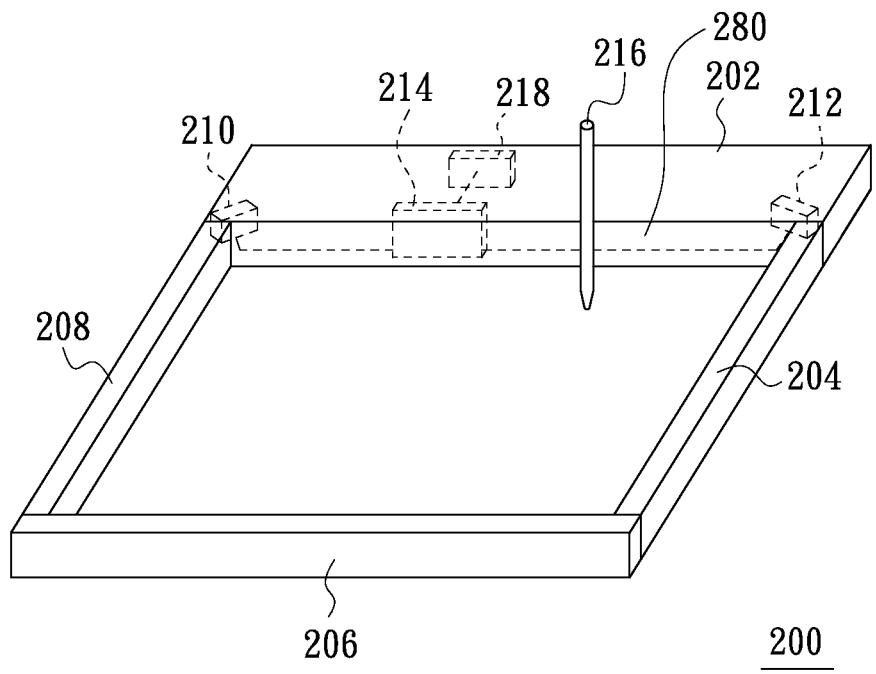
FIG. 2A is a perspective schematic view of a sensing system in accordance with a embodiment of the present invention.

Referring to FIG. 2A, an embodiment of the present invention provides a variable size sensing system 200. The sensing system 200 includes variable length elements 202, 204, 206 and 208, image sensing devices 210 and 212, and a processing circuit 214. The four variable length elements are consecutively connected into a frame. The inner edge of the frame defines a parallelogram-shaped sensing area. In this embodiment, the sensing area has a rectangular shape. Surfaces of the variable length elements 204, 206 and 208 facing the sensing area are applied with a reflective material such as a retro-reflective material. The reflective property of these surfaces is independent of the change in length of the elements 204, 206 and 208. The function of the reflective material will become more clear from discussion which follows later in this description.

In this embodiment, the variable length element 202 has a shell structure so that the image sensing devices 210 and 212 and the processing circuit 214 can be disposed therein. In addition, the variable length element 202 has a light transmitting surface 280 so that the image sensing devices 210 and 212 can both sense images coming through the light transmitting surface 280. The image sensing devices 210 and 212 are respectively disposed on the two ends of the variable length element 202 and located at two different corners of the sensing area so that the sensing ranges of the two image sensing devices respectively cover the sensing area. The two image sensing devices are electrically connected to the processing circuit 214 so that when a pointer 216 enters the sensing area, the processing circuit 214 can calculate the coordinates of the pointer 216 according to the images sensed by the image sensing devices.

Figure 2B:
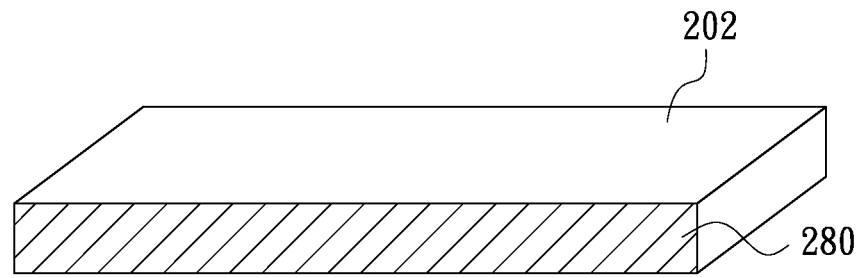
FIG. 2B is a perspective schematic view of one possible design of a light transmitting surface of the sensing system depicted in FIG. 2A.
Figure 2C:
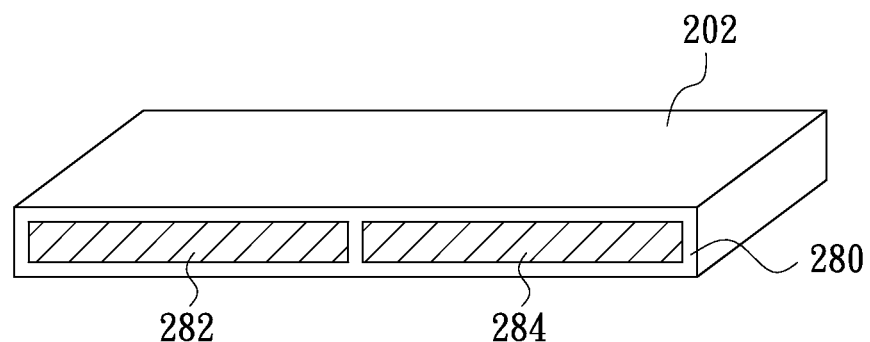
FIG. 2C is a perspective schematic view of another possible design of a light transmitting surface of the sensing system depicted in FIG. 2A.
Figure 2D:
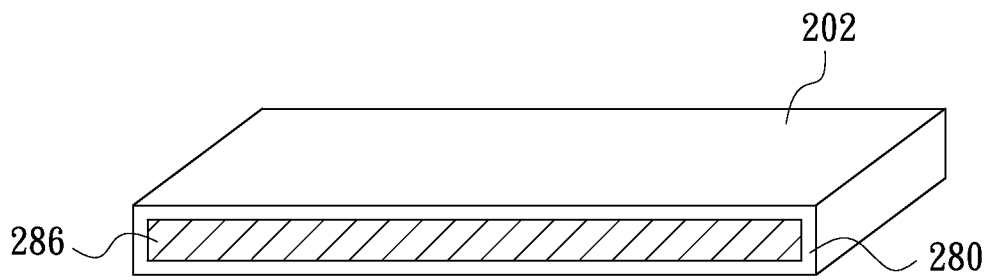
FIG. 2D is a perspective schematic view of yet another possible design of a light transmitting surface of the sensing system depicted in FIG. 2A.

It should be noted that the light transmitting surface 280 can be designed as a whole transparent plane as depicted in FIG. 2B. The light transmitting surface 280 can be further designed to allow only infrared light to pass through and function as an infrared pass filter. Alternatively, the light transmitting surface 280 can be designed to have two transparent windows 282 and 284 as illustrated in FIG. 2C. The transparent windows 282 and 284 must be respectively placed close to the image sensing devices 210 and 212 and must have sufficient area so that the image sensing devices 210 and 212 can respectively sense images coming from the sensing area through the respective transparent windows. In the same way, the transparent windows can be designed to allow only infrared light to pass through. Moreover, the light transmitting surface 280 can be designed to have only one transparent window 286, as illustrated in FIG. 2D, as long as the image sensing devices 210 and 212 can sense images coming from the sensing area through the transparent window 286. Further in the same way, the transparent window 286 can also be designed to allow only infrared light to pass through.

Referring to FIG. 2A, to make the sensing system 200 have communication capability, the variable length element 202 can be designed to further include a communication interface 218. The communication interface 218 is electrically connected to the processing circuit 214 so as to transmit data output by the processing circuit 214 to a receiver (not shown in FIG. 2A) by a communication protocol. The communication interface 218 can be a wired or wireless interface, and can be a USB (Universal Serial Bus) interface as well.

Figure 3:
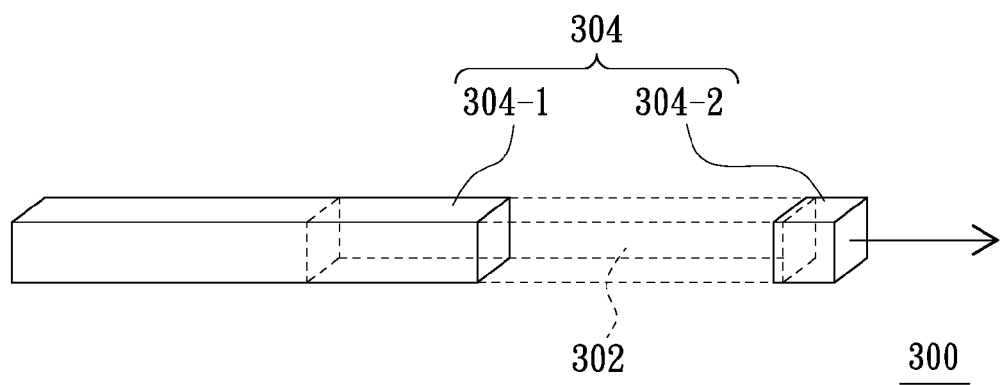
FIG. 3 is a perspective schematic view of a possible design of a variable length element of the sensing system depicted in FIG. 2A.
Figure 4:
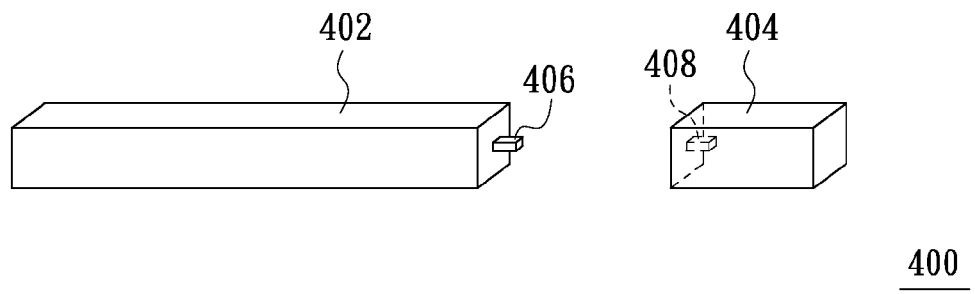
FIG. 4 is a perspective schematic view of another possible design of a variable length element of the sensing system depicted in FIG. 2A.

The following two examples are given to illustrate how the variable length elements can be structured, although they are not intended to be directly applied to the elements 202, 204, 206 and 208 or to limit the scope of the present invention. Referring to FIG. 3, which illustrates one possible structure of the variable length element, the variable length element 300 includes a shell 302 and another shell 304, the shell 304 including an element 304-1 and an element 304-2. The shell 304 is configured to accommodate the shell 302. When the element 304-2 moves along the direction of the arrow in FIG. 3, the shell 302 accommodated in the shell 304 is pulled out by the element 304-2. In other words, the variable length element 300 is a retractable element. Referring to FIG. 4, which illustrates another possible structure of the variable length element, the variable length element 400 includes an element 402 and an element 404. The element 402 has a protrusion 406 and the element 404 has a recess 408. The element 402 and the element 404 are connected to each other through the protrusion 406 and the recess 408. In other words, the variable length element 400 is a combined element.

Figure 5:
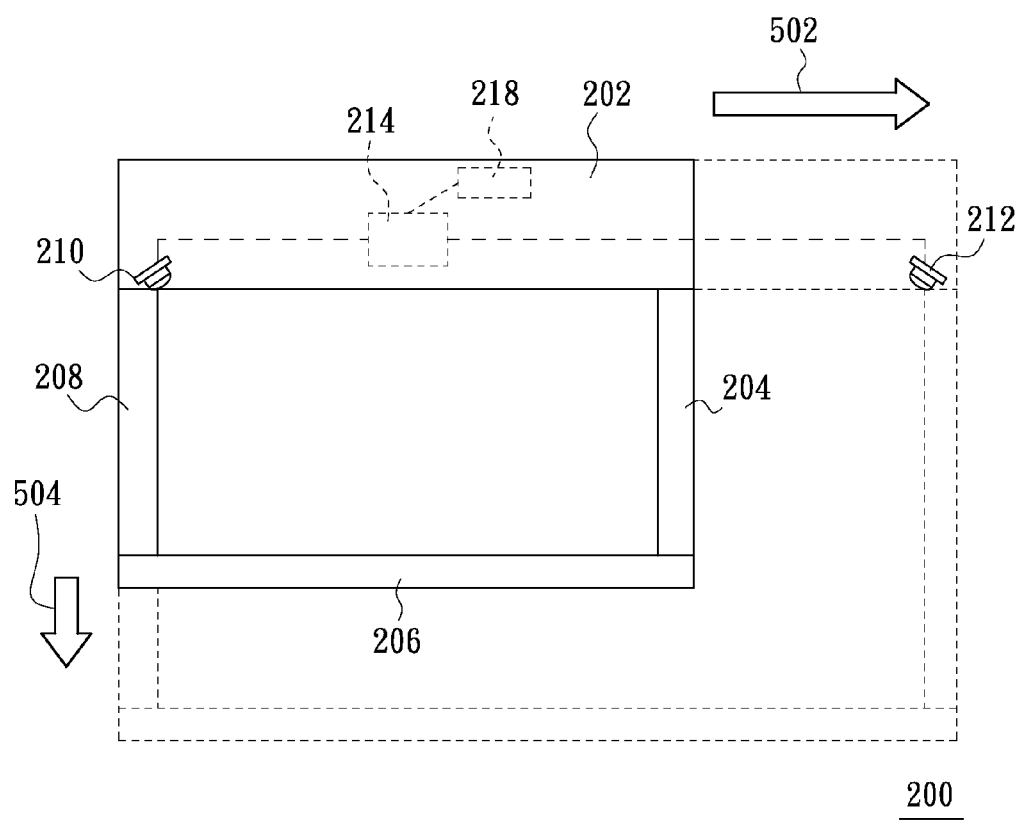
FIG. 5 is a top view of the sensing system depicted in FIG. 2A illustrating how the sensing system's size is changed.

Referring to FIG. 5, in the four variable length elements, the element 202 and the element 206 are configured to increase their lengths along the direction of the arrow 502, while the element 204 and the element 208 are configured to increase their lengths along the direction of the arrow 504, so that the size of the frame composed by the elements 202, 204, 206 and 208 can be adjusted and the sensing area defined by the frame can be increased. It is noted here that the image sensing device 212 need to move along the direction of the arrow 502 while the element 202 changes its length so as to always stay at the corner of the sensing area after the size of the area is changed and thereby make sure the sensing range of the image sensing device 212 covers the adjusted sensing area. In addition, the image sensing device 212 also needs to stay in electrical connection with the processing circuit 214 after being moved.

It is understood that the variable length elements 202 and 206 can also move along a direction opposite to the arrow 502 to increase their lengths while the variable length elements 204 and 208 can also move along a direction of the arrow 504 to increase their lengths, so that a larger sensing area can be defined. It is noted that in this case, the image sensing devices 210 and 212 also need to always stay at the corners of the sensing area after the size thereof is changed.

Referring to FIG. 5, the sensing area defined by solid lines is the sensing area the sensing system 200 has in a first working mode. The sensing area has a predetermined first size and therefore all the coordinates in the sensing area are predefined. In this working mode, the variable length elements 202, 204, 206 and 208 all have their original lengths without being elongated. If a pointer is placed in any location in the sensing area, the sensing system 200 can detect the coordinates of the pointer's position. The method for such detection is illustrated in FIG. 6.

Figure 6:
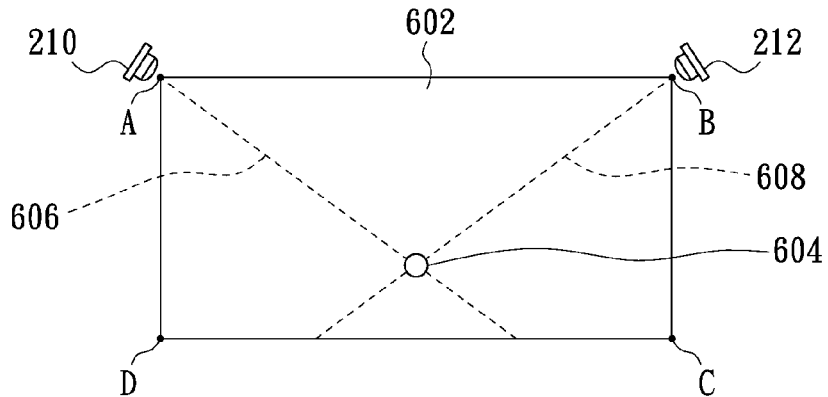
FIG. 6 illustrates the detection of coordinates of a pointer in the sensing area of the sensing system depicted in FIG. 2A.

Referring to FIG. 6, the sensing system 200 has image sensing devices 210 and 212, and a sensing area 602, which has the above-mentioned first size. The sensing area 602 has consecutive first, second, third and fourth boundaries $\overline{AB}$, $\overline{BC}$, $\overline{CD}$ and $\overline{DA}$. A pointer 604 placed in the sensing area 602 is to be detected. The image sensing devices 210 and 212 can sense the pointer 604 respectively along the sensing lines 606 and 608. Thus, if the equations of the two sensing lines are determined, the coordinates of the cross point of the sensing lines, i.e., the coordinates of the position of the pointer 604 can be calculated.

Figure 7:
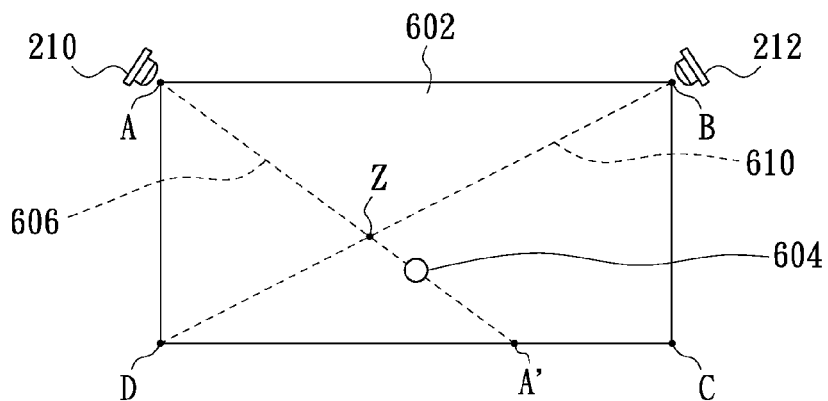
FIG. 7 illustrates how the equation of the sensing line 606 in the sensing system depicted in FIG. 2A can be determined.

FIG. 7 illustrates how the equation of the sensing line 606 can be determined. In order to determine the equation of the sensing line 606, the coordinates of the point A and A' need to be determined first. Because of the size of the sensing area is predetermined, the coordinates of the points A, B, C and D are all known by the system. For the same reason, the vertical coordinate of the point A' is known, and it is the same as the vertical coordinate of the point D. The horizontal coordinate of the point A' is yet to be determined. If an imaginary line 610 is drawn between the point B and the point D, the imaginary line 610 will cross the sensing line 606 at a point Z. The triangle composed by $\overline{AB}$, $\overline{BZ}$ and $\overline{ZA}$ and the triangle composed by $\overline{DA'}$, $\overline{A'Z}$ and $\overline{ZD}$ are similar triangles. The proportion of the length of $\overline{BZ}$ to the length of $\overline{ZD}$ is equal to the proportion of the length of $\overline{AB}$ to the length of $\overline{DA'}$. Hence, if the proportion of the length of $\overline{BZ}$ to the length of $\overline{ZD}$ is determined, the length of $\overline{DA'}$ can be derived.

In practice, the imaginary line 610 can be realized by the light reflected by the reflective material on the variable length elements 204 and 206. The light reflected by the variable length elements 204 and 206 forms a bright line in the image sensed by the image sensing device 210. The bright line corresponds to the imaginary line 610. In this bright line, there is a dark mark corresponding to the position of the point Z because of the placement of the pointer 604.

Referring to FIG. 7, because the sensing resolution of the image sensing device 210 is known, the proportion of the length of $\overline{BZ}$ to the length of $\overline{ZD}$ can be calculated according to the number of pixels corresponding to $\overline{BZ}$ and the number of pixels corresponding to $\overline{ZD}$ in the bright line in the image sensed by the image sensing device 210, which corresponds to the imaginary line 610. This proportion is equal to the proportion of the length of $\overline{AB}$ to the length of $\overline{DA'}$, and because the length of $\overline{AB}$ is known, the length of $\overline{DA'}$ can be calculated and so can calculate the horizontal coordinate of the point A'. After that, the linear equation of the sensing line 606 can be determined according to the coordinates of the point A and the point A'.

Figure 8:
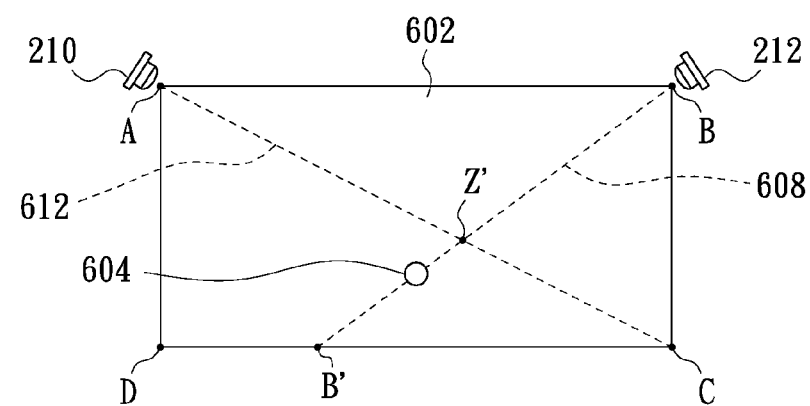
FIG. 8 illustrates how the equation of the sensing line 608 in the sensing system depicted in FIG. 2A can be determined.

In the same way, the linear equation of sensing line 608 can be determined. Referring to FIG. 8, the point Z' is the cross point of the sensing line 608 and an imaginary line 612. The triangle composed by $\overline{AB}$, $\overline{BZ'}$ and $\overline{Z'A}$ and the triangle composed by $\overline{B'C}$, $\overline{CZ'}$ and $\overline{Z'B'}$ are similar triangles. The proportion of the length of $\overline{Z'A}$ to the length of $\overline{CZ'}$ is equal to the proportion of the length of $\overline{AB}$ to the length of $\overline{B'C}$. Hence, if the proportion of the length of $\overline{Z'A}$ to the length of $\overline{CZ'}$ is determined, the length of $\overline{B'C}$ can be derived.

In practice, the imaginary line 612 can be realized by the light reflected by the reflective material on the variable length elements 206 and 208. The light reflected by the variable length elements 206 and 208 forms a bright line in the image sensed by the image sensing device 212. The bright line corresponds to the imaginary line 612. In this bright line, there is a dark mark corresponding to the position of the point Z' because of the placement of the pointer 604.

Referring to FIG. 8, because the sensing resolution of the image sensing device 212 is known, the proportion of the length of $\overline{CZ'}$ to the length of $\overline{Z'A}$ can be calculated according to the number of pixels corresponding to $\overline{CZ'}$ and the number of pixels corresponding to $\overline{Z'A}$ in the bright line in the image sensed by the image sensing device 212, which corresponds to the imaginary line 612. This proportion is equal to the proportion of the length of $\overline{B'C}$ to the length of $\overline{AB}$, and because the length of $\overline{AB}$ is known, the length of $\overline{B'C}$ can be calculated and so can calculate the horizontal coordinate of the point B'. After that, the linear equation of the sensing line 608 can be determined according to the coordinates of the point B and the point B'. According to the linear equations of sensing lines 606 and 608, the coordinates of the cross point of the two sensing lines can be calculated.

Referring to FIG. 5, the dashed lines illustrate an object working mode of the sensing system 200. The sensing area in this working mode is enlarged to an object size comparing to the first working mode. Transforming from the first working mode to the object working mode, the sensing system 200 undergoes two stages. In the first stage, the variable length elements 202 and 206 are elongated along the direction of the arrow 502. In the second stage, the variable length elements 204 and 208 are elongated along the direction of the arrow 504.

Because the sensing area of the sensing system 200 in the object working mode is not predetermined, most of the coordinates in the sensing area in this mode are undefined. Thus the processing circuit 214 need to determine, for the object sensing area comparing to the sensing area of the first size, by how much it is elongated in the horizontal direction and by how much it is elongated in the vertical direction, so as to redefine the size of the sensing area 602 and the coordinates in the sensing area 602 and thereby determine a pointer's position in the object sensing area.

Figure 9:
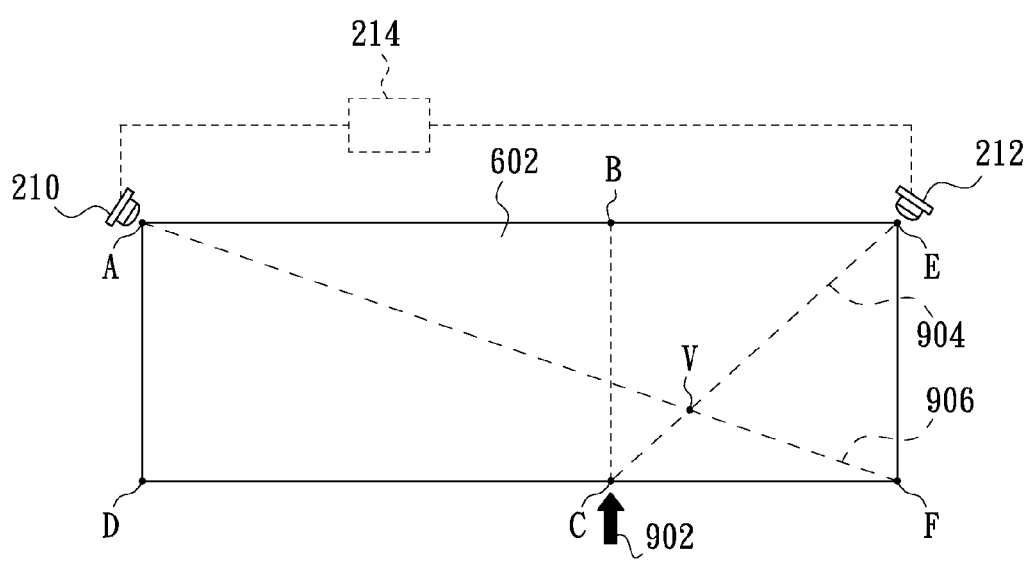
FIG. 9 illustrates the operations that the processing circuit 214 carries out when the sensing system depicted in FIG. 2A is in a second working mode and the sensing area thereof has a second size.

FIG. 9 illustrates the operations that the processing circuit 214 carries out after the above-mentioned first stage is completed before the second stage is initiated. Referring to FIG. 9, the sensing system 200 is in a second working mode, in which the sensing area 602 has a second size and consecutive fifth, sixth, seventh and eighth boundaries $\overline{AE}$, $\overline{EF}$, $\overline{FD}$ and $\overline{DA}$. It is noted that the first, second, third and fourth boundaries $\overline{AB}$, $\overline{BC}$, $\overline{CD}$ and $\overline{DA}$ defining the sensing area in the first working mode are also shown in FIG. 9 for comparison. As shown in FIG. 9, $\overline{AE}$, $\overline{FD}$ and $\overline{DA}$ respectively partially overlap $\overline{AB}$, $\overline{CD}$ and $\overline{DA}$, and the lengths of $\overline{AE}$ and $\overline{FD}$ are respectively greater than the lengths of $\overline{AB}$ and $\overline{CD}$.

Figure 10:
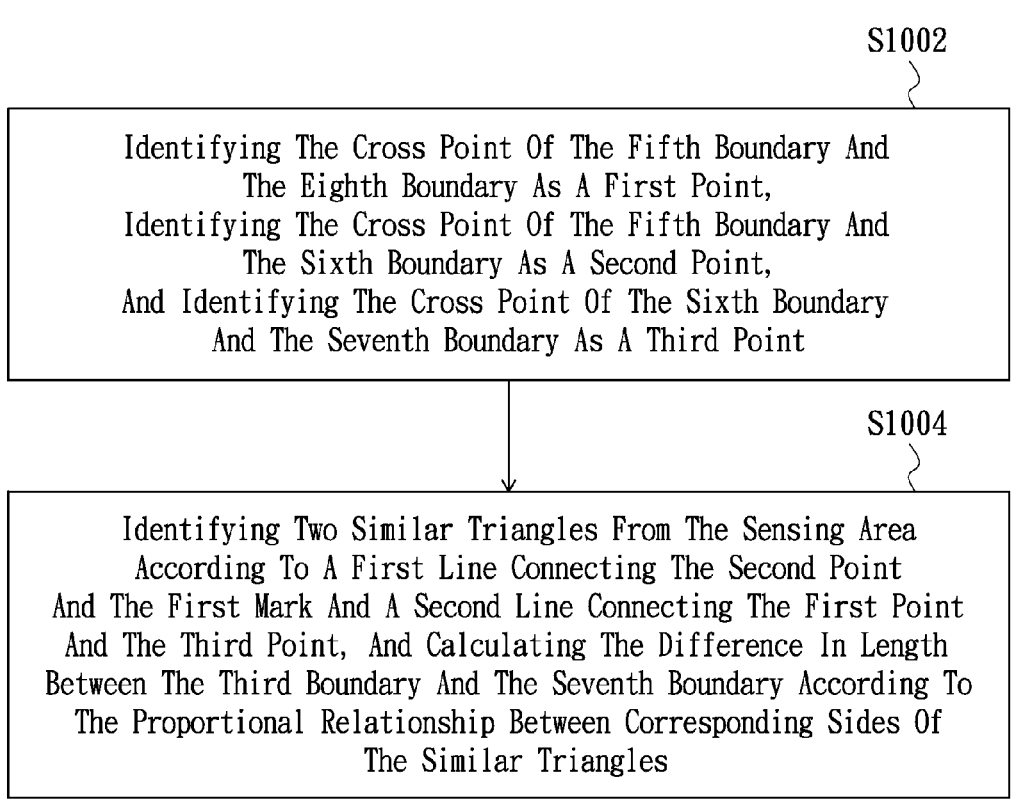
FIG. 10 illustrates the process of the processing circuit 214 calculating the difference between the length of $\overline{FD}$ and the length of $\overline{CD}$.

Referring to FIG. 9, the difference between the length of $\overline{FD}$ and the length of $\overline{CD}$, i.e., the length of $\overline{CF}$ is the elongated amount of the sensing area 602 in the horizontal direction when changing from the first working mode to the second working mode. To determine the length of $\overline{CF}$ correctly, a first mark in made on a surface of the variable length element 206 facing the sensing area 602 for marking the length of $\overline{CD}$. The first mark is illustrated by the arrow 902 in FIG. 9. By utilizing the first mark 902 sensed by the image sensing devices 210 and 212, the processing circuit 214 can calculate the length of $\overline{CF}$. FIG. 10 illustrates the process of such calculation.

Referring to FIG. 9 and FIG. 10, to calculate the length of $\overline{CF}$, from the images of the sensing area 602 taken by the image sensing devices 210 and 212, the processing circuit 214 identifies the cross point of $\overline{AE}$ and $\overline{DA}$ and regards it as the point A, identifies the cross point of $\overline{AE}$ and $\overline{EF}$ and regards it as the point E, and identifies the cross point of $\overline{EF}$ and $\overline{FD}$ and regards it as the point F, as shown in the step S1002. In addition, the image sensing device 212 can sense the first mark 902 along the path of the sensing line 904, which is a line connecting the point E and the first mark 902.

If an imaginary line 906 connecting the point A and the point F is provided, the sensing line 904 will cross the imaginary line 906 at a point V, and the triangle composed by $\overline{AE}$, $\overline{EV}$ and $\overline{VA}$ and the triangle composed by $\overline{CF}$, $\overline{FV}$ and $\overline{VC}$ are similar triangles. The processing circuit 214 can calculate difference in the length of $\overline{FD}$ and the length of $\overline{CD}$ according to the proportional relationship between the corresponding sides of the similar triangles, as shown in the step S1004. More specifically, for the two similar triangles, $$\frac{\overline{FV}}{\overline{VA}} = \frac{\overline{CF}}{\overline{AB} + \overline{BE}} \quad (1)$$

and because $\overline{BE} = \overline{CF}$, (1) gives:

$$\frac{\overline{FV}}{\overline{VA}} = \frac{\overline{CF}}{\overline{AB} + \overline{CF}}, \quad (2)$$

In practice, the imaginary line 906 can be realized by the light reflected by the reflective material on the variable length elements 206 and 208. The light reflected by the variable length elements 206 and 208 forms a bright line in the image sensed by the image sensing device 212. The bright line corresponds to the imaginary line 906. In this bright line, there is a dark mark corresponding to the position of the point V because of the placement of the first mark 902. Because the sensing resolution of the image sensing device 212 is known, the proportion of the length of $\overline{FV}$ to the length of $\overline{VA}$ can be calculated according to the number of pixels corresponding to $\overline{FV}$ and the number of pixels corresponding to $\overline{VA}$ in the bright line in the image sensed by the image sensing device 212, which corresponds to the imaginary line 906. In addition, because the length of $\overline{AB}$ is known, the processing circuit 214 can calculate the length of $\overline{CF}$, i.e., the difference between the length of $\overline{FD}$ and the length of $\overline{CD}$ from the above equation (2).

Figure 11:
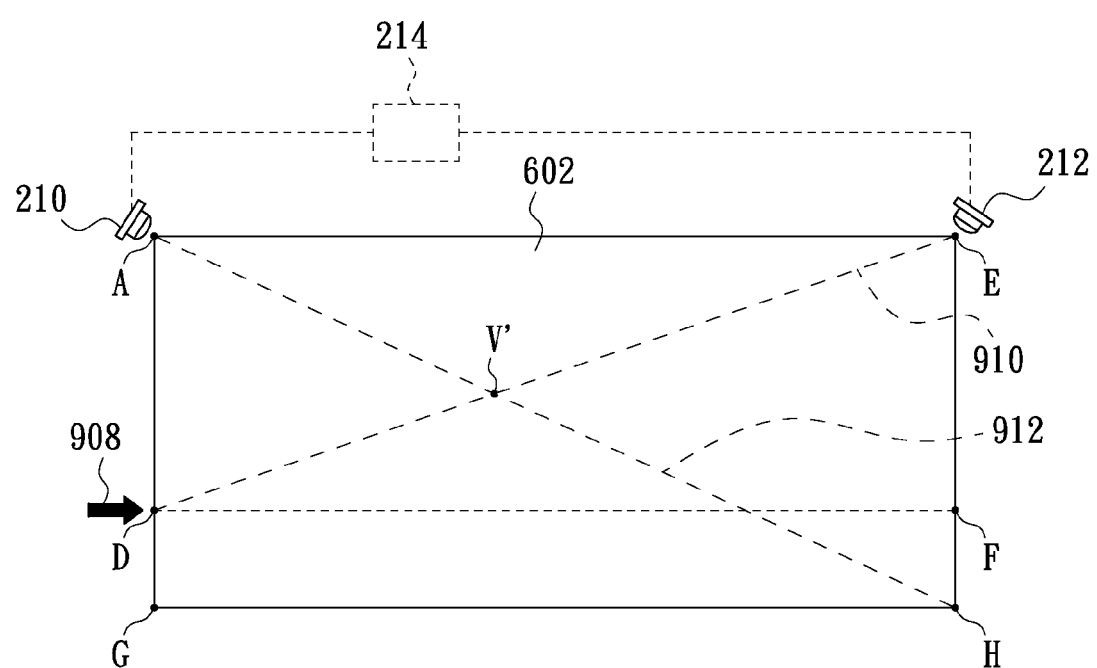
FIG. 11 illustrates the operations that the processing circuit 214 carries out when the sensing system depicted in FIG. 2A is in a third working mode and the sensing area thereof has a third size.

FIG. 11 illustrates the operations of the processing circuit 214 carries out after the above-mentioned second stage is completed. Referring to FIG. 11, the sensing system 200 is in the object working mode, in which the sensing area 602 has a third size and consecutive ninth, tenth, eleventh, twelfth boundaries $\overline{AE}$, $\overline{EH}$, $\overline{HG}$ and $\overline{GA}$. It is noted the fifth, sixth, seventh, and eighth boundaries $\overline{AE}$, $\overline{EF}$, $\overline{FD}$ and $\overline{DA}$ defining the sensing area in the second working mode are also shown in FIG. 11 for comparison. As shown in FIG. 11, $\overline{AE}$, $\overline{EH}$ and $\overline{GA}$ respectively partially overlap $\overline{AE}$, $\overline{EF}$ and $\overline{DA}$, and the lengths of $\overline{EH}$ and $\overline{GA}$ are respectively greater than the lengths of $\overline{EF}$ and $\overline{DA}$.

Figure 12:
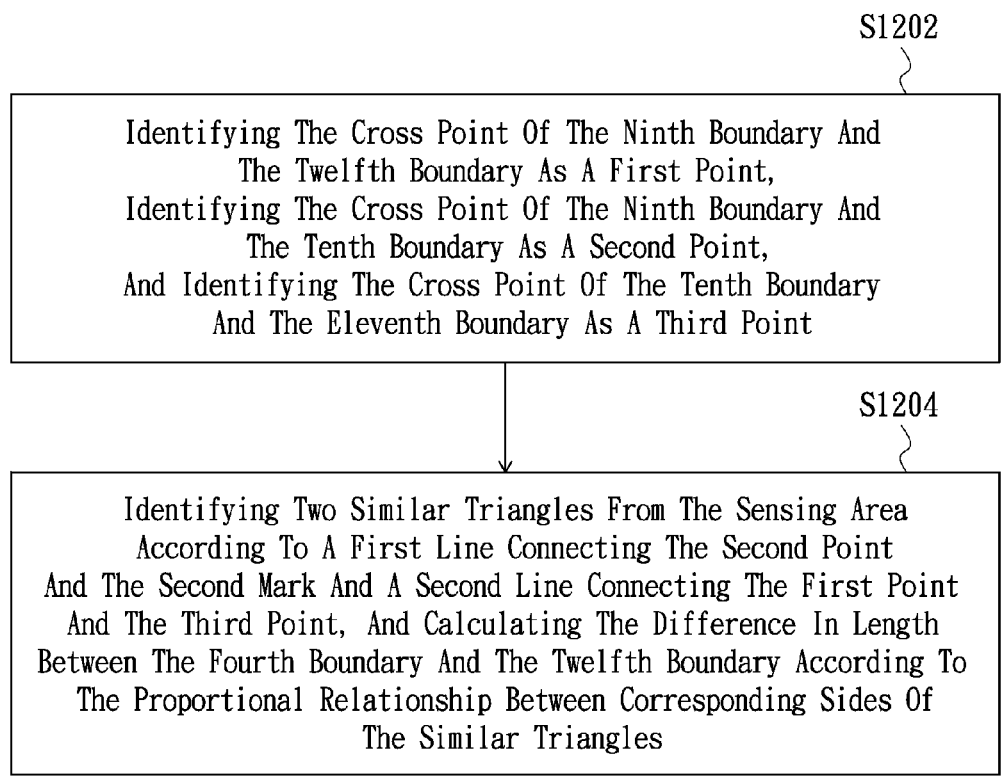
FIG. 12 illustrates the process of the processing circuit 214 calculating the difference between the length of $\overline{GA}$ and the length of $\overline{DA}$.

Referring to FIG. 11, the difference between the length of $\overline{GA}$ and the length of $\overline{DA}$, i.e., the length of $\overline{DG}$ is the elongated amount of the sensing area 602 in the vertical direction when changing from the second working mode to the object working mode. To determine the length of $\overline{DG}$ correctly, a second mark in made on a surface of the variable length element 208 facing the sensing area 602 for marking the length of $\overline{DA}$. The second mark is illustrated by the arrow 908 in FIG. 11. By utilizing the second mark 908 sensed by the image sensing devices 210 and 212, the processing circuit 214 can calculate the length of $\overline{DG}$. FIG. 12 illustrates the process of such calculation.

Referring to FIG. 11 and FIG. 12, to calculate the length of $\overline{DG}$, from the images of the sensing area 602 taken by the image sensing devices 210 and 212, the processing circuit 214 identifies the cross point of $\overline{AE}$ and $\overline{GA}$ and regards it as the point A, identifies the cross point of $\overline{AE}$ and $\overline{EH}$ and regards it as the point E, and identifies the cross point of $\overline{EH}$ and $\overline{HG}$ and regards it as the point H, as shown in the step S1202. In addition, the image sensing device 212 can sense the second mark 908 along the path of the sensing line 910, which is a line connecting the point E and the second mark 908.

If an imaginary line 912 connecting the point A and the point H is provided, the sensing line 910 will cross the imaginary line 912 at a point V', and the triangle composed by $\overline{AV'}$, $\overline{V'D}$ and $\overline{DA}$ and the triangle composed by $\overline{V'E}$, $\overline{EH}$ and $\overline{HV'}$ are similar triangles. The processing circuit 214 can calculate difference in the length of $\overline{GA}$ and the length of $\overline{DA}$ according to the proportional relationship between the corresponding sides of the similar triangles, as shown in the step S1204. More specifically, for the two similar triangles, $$\frac{\overline{AV'}}{\overline{HV'}} = \frac{\overline{DA}}{\overline{EF} + \overline{FH}} \quad (3)$$

and because $\overline{FH} = \overline{DG}$, (3) gives:

$$\frac{\overline{AV'}}{\overline{HV'}} = \frac{\overline{DA}}{\overline{EF} + \overline{DG}}, \quad (4)$$

In practice, the imaginary line 912 can be realized by the light reflected by the reflective material on the variable length elements 206 and 208. The light reflected by the variable length elements 206 and 208 forms a bright line in the image sensed by the image sensing device 212. The bright line corresponds to the imaginary line 912. In this bright line, there is a dark mark corresponding to the position of the point V' because of the placement of the second mark 908. Because the sensing resolution of the image sensing device 212 is known, the proportion of the length of $\overline{AV'}$ to the length of $\overline{HV'}$ can be calculated according to the number of pixels corresponding to $\overline{AV'}$ and the number of pixels corresponding to $\overline{HV'}$ in the bright line in the image sensed by the image sensing device 212, which corresponds to the imaginary line 912. In addition, because the lengths of $\overline{DA}$ and $\overline{EF}$ are known, the processing circuit 214 can calculate the length of $\overline{DG}$, i.e., the difference between the length of $\overline{GA}$ and the length of $\overline{DA}$ from the above equation (4). After the lengths of $\overline{CF}$ and $\overline{DG}$ are both calculated, the processing circuit 214 can redefine the coordinates in the sensing area 602 according to the redefined size of the sensing area 602. Thereby, after being increased to the object size, the sensing system 200 can detect the coordinates of a pointer placed in the sensing area 602 in the same way as described by FIG. 6-FIG. 8.

In this embodiment, after the sensing system 200 increases its size, the size of the sensing area 602 thereof is redefined. Thus the area available for inputting coordinates in the system 200 can be changed by demand. Referring to FIG. 5, it is understood that the sensing system 200 in the first working mode can also be operated to increase the lengths of the variable length elements 204 and 208 in the direction of the arrow 504 and then be operated to increase the lengths of the variable length elements 202 and 206 in the direction of the arrow 502. In this case, the operations of the processing circuit 214 should change accordingly.

Further, the sensing system 200 in the first working mode can be operated to only increase the lengths of the variable length elements 202 and 206 in the direction of the arrow 502, as long as after that the sensing area 602 is redefined according to the first mark 902. Similarly, the sensing system 200 in the first working mode can be operated to only increase the lengths of the variable length elements 204 and 208 in the direction of the arrow 504, as long as after that the sensing area 602 is redefined according to the second mark 908. In addition, the variable length elements 204 and 208 as shown in FIG. 2A may be replaced by regular fixed length elements, or the variable length elements 202 and 206 as shown in FIG. 2A may be replaced by regular fixed length elements.

Figure 13:
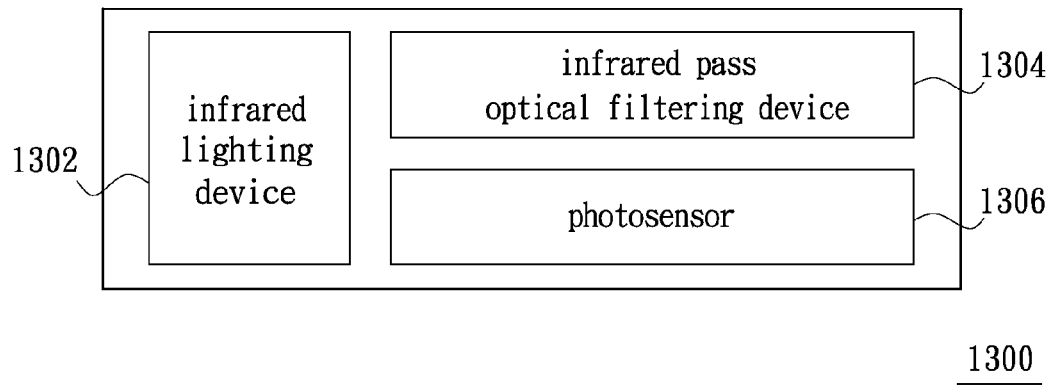
FIG. 13 illustrates the architecture of an image sensing device suitable for being used with the reflective material in the sensing system depicted in FIG. 2A.

Referring to FIG. 13, an image sensing device 1300 suitable for being used with the above-mentioned reflective material is provided. The image sensing device 1300 includes an infrared lighting device 1302, an infrared pass optical filtering device 1304 and a photosensor 1306. The photosensor 1306 receives images through the infrared pass optical filtering device 1304 and is electrically connected to the processing circuit 214. In addition, the infrared lighting device 1302 can be realized by an infrared light emitting diode (IR LED). The infrared pass optical filtering device 1304 can be realized by an infrared pass filter.

Figure 14:
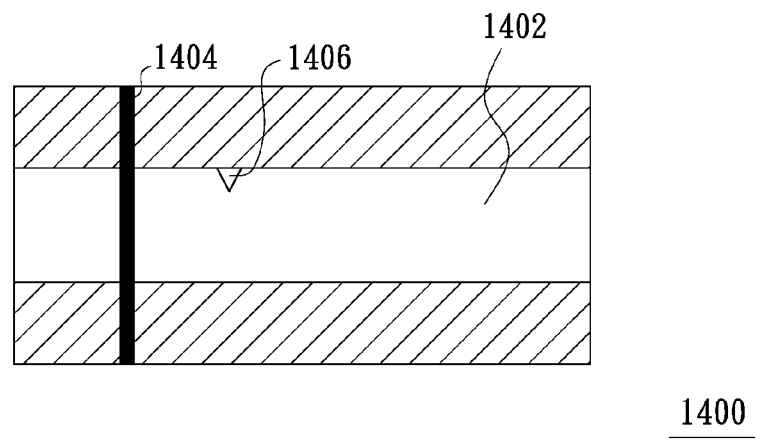
FIG. 14 illustrates an image sensed by the image sensing device 210 in the sensing system depicted in FIG. 2A.

If the image sensing device 210 in FIG. 2A has the same architecture as the image sensing device 1300, and the sensing system 200 has a size increase, the image sensed by the image sensing device 210 is illustrated in FIG. 14. Referring to FIG. 14, in the image sensing window 1400 of the image sensing device 210, a bright zone 1402 is formed on the image by the light reflected from the reflective material on the variable length elements. The bright zone corresponds to the main sensing area. The dark mark 1404 is formed because of the pointer 216. The mark 1406 is the sensed first mark. Thus, when the image sensing device 210 senses images of the sensing area, the reflective material is configured to generate a background for the pointer 216 to make the position of the pointer 216 clear. It is understood the pointer used in this embodiment is not limited to a certain shape, but it should be able to be sensed by the image sensing device and can be differentiated from the reflective material.

Although in the above embodiment, the first mark 902 is used to mark the length of the variable length element 206 when the sensing area has a first size, it is understood as long as the first mark 902 is disposed on a surface of the variable length element 206 facing the sensing area 602, and apart from the variable length element 208 by a fixed distance, then the image sensing devices in the system can still sense the first mark 902 and using the first mark 902 to calculate the difference in length of the variable length element 206 between the first working mode and the second working mode so that the size of the sensing area 602 can be redefined. Similarly, as long as the second mark 908 is disposed on a surface of the variable length element 208 facing the sensing area 602, and apart from the variable length element 202 by a fixed distance, then the image sensing devices in the system can still sense the second mark 908 and using the second mark 908 to calculate the difference in length of the variable length element 208 between the first working mode and the second working mode so that the size of the sensing area 602 can be redefined.

Figure 15:
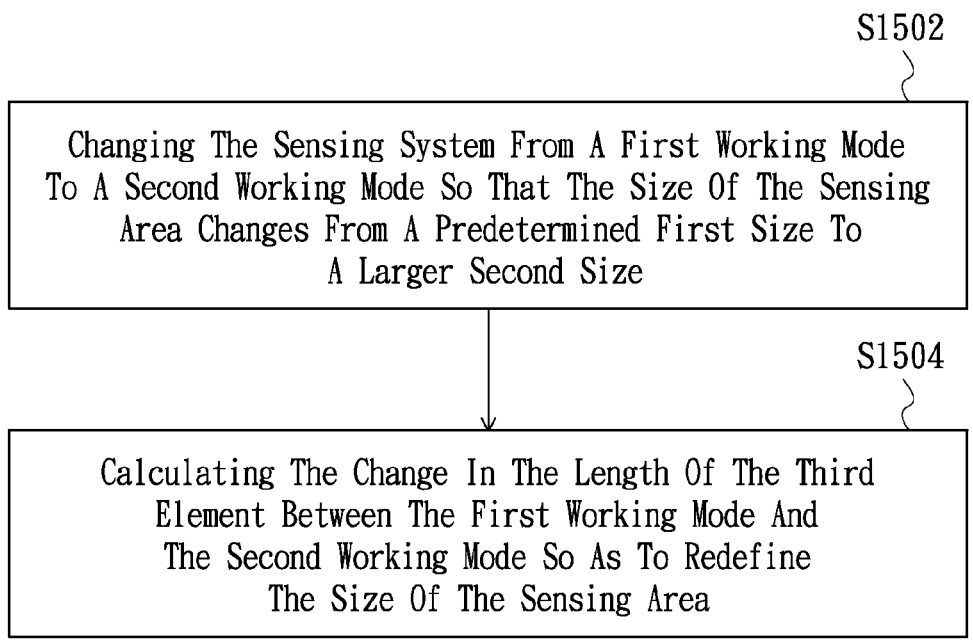
FIG. 15 illustrates the main process of a method for redefining the size of a sensing area of a variable size sensing system according to an embodiment of the present invention.

From the above embodiments, two methods for redefining the size of the sensing area can be deduced. Referring to FIG. 15, one of such methods suitable for a variable size sensing system is provided. The sensing system includes a first element, a second element, a third element and a fourth element, the four elements being consecutively connected and thereby forming a frame. The first element and the third element are capable of increasing their lengths in a predetermined direction so that the size of the frame is adjusted. The inner edge of the frame defines a sensing area. The sensing area has a parallelogram shape. Reflective material is applied to surfaces of the second, the third and the fourth elements facing the sensing area. The sensing system further has a mark disposed on a surface of the third element facing the sensing area and apart from the fourth element by a fixed distance. In the method includes: changing the sensing system from a first working mode to a second working mode so that the size of the sensing area changes from a predetermined first size to a larger second size (step S1502); calculating the change in the length of the third element between the first working mode and the second working mode so as to redefine the size of the sensing area (S1504).

Figure 16:
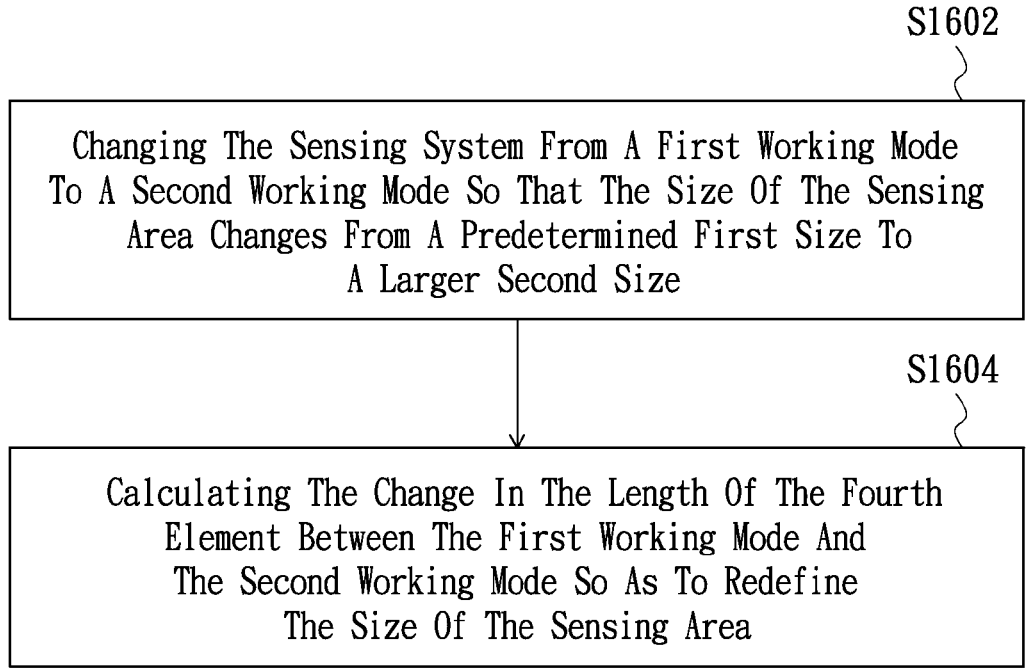
FIG. 16 illustrates the main process of a method for redefining the size of a sensing area of a variable size sensing system according to another embodiment of the present invention.

Referring to FIG. 16, another method for redefining the size of a sensing area of a variable size sensing system is provided. The sensing system includes a first element, a second element, a third element and a fourth element, the four elements being consecutively connected and thereby forming a frame. The second element and the fourth element are capable of increasing their lengths in a predetermined direction so that the size of the frame is adjusted. The predetermined direction is the direction departing from the first element. The inner edge of the frame defines a sensing area. The sensing area has a shape of a parallelogram. Reflective material is applied to surfaces of the second, the third and the fourth elements facing the sensing area. The sensing system further has a mark disposed on a surface of the fourth element facing the sensing area and apart from the first element by a fixed distance. The method includes changing the sensing system from a first working mode to a second working mode so that the size of the sensing area changes from a predetermined first size to a larger second size (step S1502); and calculating the change in the length of the fourth element between the first working mode and the second working mode so as to redefine the size of the sensing area (S1504).

Figure 17:
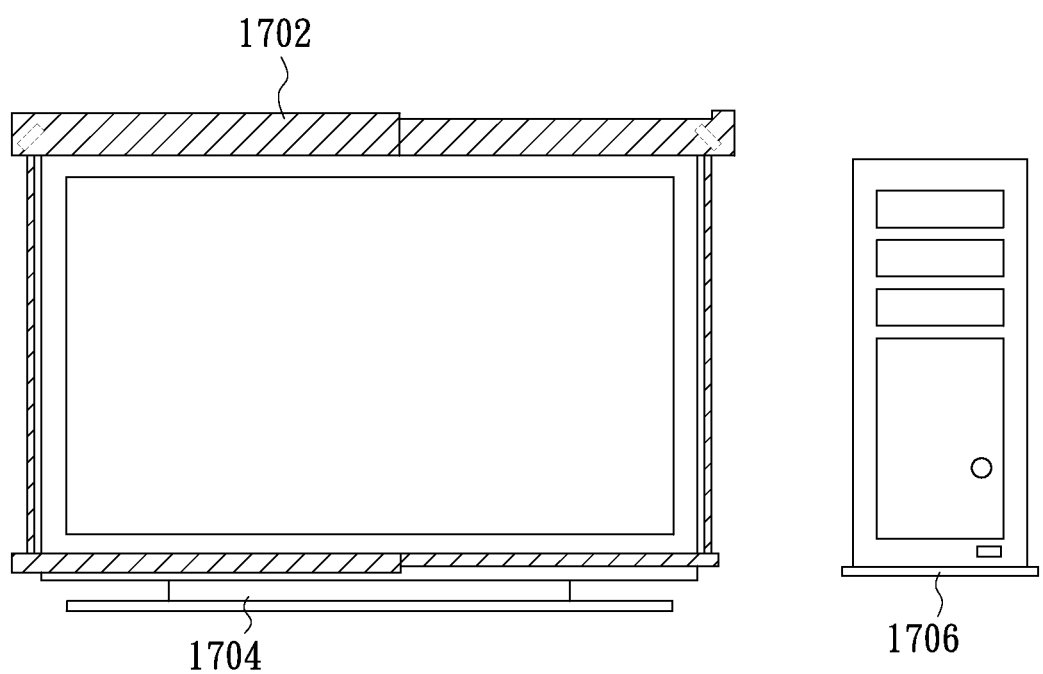
FIG. 17 illustrates a way of applying a sensing system according to the embodiments of the present invention.

FIG. 17 illustrates a way of applying the sensing system provided by the embodiments of the present invention. Referring to FIG. 17, a user may attach a variable size sensing system 1702 provided by the present invention to a regular computer screen 1704 and use a finger or other pointers to input coordinates, which makes the computer screen function as a touch screen. If the communication interface that the sensing system 1702 has is a wired interface, then the sensing system 1702 can transmit the positional information to the computer host 1706 by wired communication. If the communication interface that the sensing system 1702 has is a wireless interface, then the sensing system 1702 can transmit the positional information to the computer host 1706 by wireless communication.

In summary, the sensing system provided by the embodiments of the present invention includes four elements, a mark and two image sensing devices. The four elements are consecutively connected and thereby forming a frame. Two of the four elements have variable lengths so as to adjust the size of the frame. The inner edge of the frame defines a sensing area of a parallelogram shape. The sensing system has a first and a second working mode. The sensing area has a first size and a second size when the sensing system is in the first working mode and the second working mode respectively, wherein the first size is predetermined and smaller than the second size. The mark is used to mark a fixed length and the image sensing devices are adjusted in position according to the working mode the sensing system is in. When the sensing system is changed from the first working mode to the second working mode, the size of the sensing area changes from the first size to the second size, the mark sensed by the image sensing device can be utilized to redefine the size of the sensing area in the sensing system. Hence, the size of the sensing area can be redefined according to the adjustment of the working mode of the sensing system so that the size of the area available for a user to input coordinates can be changed according to the specific demand of the user.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A variable size sensing system comprising:
a first element;
a second element;
a third element;
a fourth element, the first, second, third and fourth elements being consecutively connected and thereby forming a first frame, the first element and the third element being capable of increasing their lengths in a predetermined direction so that the size of the first frame can be adjusted and forms a second frame, the inner edge of the first frame defining a sensing area that has a parallelogram shape, surfaces of the second, the third and the fourth elements facing the sensing area being applied with a reflective material;
at least one image sensing device configured for sensing images reflected by the second and third elements; and
a mark disposed on a surface of the third element facing the sensing area and apart from the fourth element by a fixed distance that equals to the length of the first element;
wherein the image sensing device is capable of sensing a location of the mark, so that the change in the length of the third element can be calculated based on the fixed distance and the location of the mark in the images reflected by the second and third elements.

2. The sensing system of claim 1, further comprising a processing circuit, the processing circuit being electrically connected to the image sensing devices, wherein when the sensing system changes from a first working mode to a second working mode so that the size of the sensing area changes from a predetermined first size to a larger second size, the processing circuit is configured for calculating the change in the length of the third element between the first working mode and the second working mode according to the images of the mark sensed by the first image sensing device so as to redefine the size of the sensing area, the processing circuit is further configured for calculating the coordinates of a pointer according to the images sensed by the image sensing devices.

3. The sensing system of claim 2, further comprising a communication interface, the communication interface being electrically connected to the processing circuit and configured for transmitting data output by the processing circuit to a receiver by a communication protocol.

4. The sensing system of claim 3, wherein the communication interface is a wired interface, a wireless interface or a Universal Serial Bus interface.

5. The sensing system of claim 1, wherein the image sensing device has an infrared lighting device.

6. The sensing system of claim 5, wherein the image sensing device comprises an infrared pass optical filtering device, the image sensing device is configured to receive images through the infrared pass optical filtering devices.

7. The sensing system of claim 1, wherein the first element has a shell structure and a light transmitting surface, the image sensing device is disposed in the first element and configured to receive images through the light transmitting surface.

8. The sensing system of claim 7, wherein the light transmitting surface is a whole transparent plane, or has a first transparent window through which the image sensing devices senses images coming from the sensing area, or has a second transparent window and a third transparent window through which the image sensing device senses images coming from the sensing area.

9. The sensing system of claim 8, wherein neither of the transparent plane, the first transparent window, the second transparent window or the third transparent windows allows any light to pass through unless the light is an infrared light.

10. A variable size sensing system comprising:
   a first element;
   a second element;
   a third element;
   a fourth element, the first, second, third and fourth elements being consecutively connected and thereby forming a first frame, the second element and the fourth element being capable of increasing their lengths in a predetermined direction so that the size of the first frame can be adjusted and forms a second frame, the predetermined direction being the direction departing from the first element, the inner edge of the first frame defining a sensing area that has a parallelogram shape, surfaces of the second, the third and the fourth elements facing the sensing area being applied with a reflective material;
   at least one image sensing device configured for sensing images reflected by the second and third elements; and
   a mark disposed on a surface of the fourth element facing the sensing area and apart from the first element by a fixed distance that equals to the length of the second element;
   wherein the image sensing device is capable of sensing a location of the mark, so that the change in the length of the fourth element can be calculated based on the fixed distance and the location of the mark in the images reflected by the second and third elements.

11. The sensing system of claim 10, further comprising a processing circuit, the processing circuit being electrically connected to the image sensing devices, wherein when the sensing system changes from a first working mode to a second working mode so that the size of the sensing area changes from a predetermined first size to a larger second size, the processing circuit is configured for calculating the change in the length of the fourth element between the first working mode and the second working mode according to the images of the mark sensed by the image sensing device so as to redefine the size of the sensing area, the processing circuit is further configured for calculating the coordinates of a pointer according to the images sensed by the image sensing devices.

12. The sensing system of claim 11, further comprising a communication interface, the communication interface being electrically connected to the processing circuit and configured for transmitting data output by the processing circuit to a receiver by a communication protocol.

13. The sensing system of claim 12, wherein the communication interface is a wired interface, a wireless interface or a Universal Serial Bus interface.

14. The sensing system of claim 10, wherein the image sensing device has an infrared lighting device.

15. The sensing system of claim 14, wherein the image sensing device comprises an infrared pass optical filtering device, the image sensing device is configured to receive images through the infrared pass optical filtering devices.

16. The sensing system of claim 10, wherein the first element has a shell structure and a light transmitting surface, the image sensing device is disposed in the first element and configured to receive images through the light transmitting surface.

17. The sensing system of claim 16, wherein the light transmitting surface is a whole transparent plane, or has a first transparent window through which the image sensing devices sense images coming from the sensing area, or has a second transparent window and a third transparent window through which the image sensing device senses images coming from the sensing area.

18. The sensing system of claim 17, wherein neither of the transparent plane, the first transparent window, the second transparent window or the third transparent windows allows any light to pass through unless the light is infrared light.

19. A method for redefining the size of a sensing area of a variable size sensing system, the sensing system comprising a first element, a second element, a third element and a fourth element, the four elements being consecutively connected and thereby forming a frame, the first element and the third element being capable of increasing their lengths in a predetermined direction so that the size of the frame is adjusted, the inner edge of the frame defining a sensing area that has a parallelogram shape, surfaces of the second, the third and the fourth elements facing the sensing area being applied with a reflective material, the sensing system further having a mark disposed on a surface of the third element facing the sensing area and apart from the fourth element by a fixed distance, the method comprising:
   changing the sensing system from a first working mode to a second working mode so that the size of the sensing area changes from a predetermined first size to a larger second size; and
   calculating the change in the length of the third element between the first working mode and the second working mode based on the fixed distance and a location of the mark in images reflected by the second and third elements so as to redefine the size of the sensing area;
   wherein when the sensing area shows the predetermined first size, the sensing area has consecutive a first, second, third and fourth boundaries respectively formed by the first, second, third and fourth elements, the fixed distance is the length of the third boundary, and when the sensing area shows the larger second size, the sensing area has consecutive a fifth, sixth, seventh and eighth boundaries respectively formed by the first, second, third and fourth elements, wherein the fifth, seventh and eighth boundaries respectively partially overlap the first, third and fourth boundaries, and the lengths of the fifth boundary and the seventh boundary are respectively greater than that of the first boundary and the third boundary, and calculating the change in the length of the third element comprises:
   identifying the cross point of the fifth boundary and the eighth boundary as a first point, identifying the cross point of the fifth boundary and the sixth boundary as a second point, and identifying the cross point of the sixth boundary and the seventh boundary as a third point; and
   identifying two similar triangles from the sensing area according to a first line connecting the second point and the mark and a second line connecting the first point and the third point, and calculating the change in the length of the third element according to the proportional relationship between corresponding sides of the similar triangles.

20. The method of claim 19, wherein when the sensing area has changed to the second size, the sensing system redefines the size of the sensing area according to the said change in the length, so as to calculate the positional coordinates of a pointer by the redefined sensing area.

21. A method for redefining the size of a sensing area of a variable size sensing system, the sensing system comprising a first element, a second element, a third element and a fourth element, the four elements being consecutively connected and thereby forming a frame, the second element and the fourth element being capable of increasing their lengths in a predetermined direction so that the size of the frame is adjusted, the predetermined direction being the direction departing from the first element, the inner edge of the frame defining a sensing area that has a parallelogram shape, surfaces of the second, the third and the fourth element facing the sensing area being applied with a reflective material, the sensing system further having a mark disposed on a surface of the fourth element facing the sensing area and apart from the first element by a fixed distance, the method comprising:

changing the sensing system from a first working mode to a second working mode so that the size of the sensing area changes from a predetermined first size to a larger second size; and calculating the change in the length of the fourth element between the first working mode and the second working mode based on the fixed distance and a location of the mark in images reflected by the second and third elements so as to redefine the size of the sensing area;

wherein when the sensing area shows the predetermined first size, the sensing area has consecutive a first, second, third and fourth boundaries respectively formed by the first, second, third and fourth elements, the fixed distance is the length of the fourth boundary, and when the sensing area shows the larger second size, the sensing area has consecutive a fifth, sixth, seventh and eighth boundaries respectively formed by the first, second, third and fourth elements, wherein the fifth, sixth and eighth boundaries respectively partially overlap the first, second and fourth boundaries, and the lengths of the sixth boundary and the eighth boundary are respectively greater than that of the second boundary and the fourth boundary, and calculating the change in the length of the fourth element comprises:

identifying the cross point of the fifth boundary and the eighth boundary as a first point, identifying the cross point of the fifth boundary and the sixth boundary as a second point, and identifying the cross point of the sixth boundary and the seventh boundary as a third point; and identifying two similar triangles from the sensing area according to a first line connecting the second point and the mark and a second line connecting the first point and the third point, and calculating the change in the length of the fourth element according to the proportional relationship between corresponding sides of the similar triangles.

22. The method of claim 21, wherein when the sensing area has changed to the second size, the sensing system redefines the size of the sensing area according to the said change in the length, so as to calculate the positional coordinates of a pointer by the redefined sensing area.

23. A method for redefining the size of a sensing area of a variable size sensing system, the sensing system comprising a first element, a second element, a third element and a fourth element, the four elements being consecutively connected and thereby forming a frame, the first element and the third element being capable of increasing their lengths in a first predetermined direction, and the second element and the fourth element being capable of increasing their lengths in a second predetermined direction so that the size of the frame is adjusted, the second predetermined direction being the direction departing from the first element, the inner edge of the frame defining a sensing area that has a parallelogram shape, surfaces of the second, the third and the fourth element facing the sensing area being applied with a reflective material, the sensing system further having a first mark and a second mark, the first mark disposed on a surface of the third element facing the sensing area and apart from the fourth element by a first fixed distance, the second mark disposed on a surface of the fourth element facing the sensing area and apart from the first element by a second fixed distance, the method comprising:

changing the sensing system from a first working mode to a second working mode so that the size of the sensing area changes from a predetermined first size to a larger second size, the lengths of two boundaries of the sensing area having the first size being equal to the lengths of two boundaries of the sensing area having the second size; and selecting one of the first mark and the second mark according to the way of adjusting the size of the sensing area, and calculating the change in the length of the element corresponding to a selected mark accordance with the selected mark;

wherein when the sensing area shows the predetermined first size, the sensing area has consecutive a first, second, third and fourth boundaries respectively formed by the first, second, third and fourth elements, the first fixed distance is the length of the third boundary and the second fixed distance is the length of the fourth boundary, and when the sensing area shows the larger second size, the sensing area has consecutive a fifth, sixth, seventh and eighth boundaries respectively formed by the first, second, third and fourth elements;

wherein if the first mark is selected, the fifth, seventh and eighth boundaries respectively partially overlap the first, third and fourth boundaries, and the lengths of the fifth boundary and the seventh boundary are respectively greater than that of the first boundary and the third boundary, and calculating the change in the length of the third element comprises:

identifying the cross point of the fifth boundary and the eighth boundary as a first point, identifying the cross point of the fifth boundary and the sixth boundary as a second point, and identifying the cross point of the sixth boundary and the seventh boundary as a third point; and identifying two similar triangles from the sensing area according to a first line connecting the second point and the mark and a second line connecting the first point and the third point, and calculating the change in the length of the third element according to the proportional relationship between corresponding sides of the similar triangles;

wherein if the second mark is selected, the fifth, sixth and eighth boundaries respectively partially overlap the first, second and fourth boundaries, and the lengths of the sixth boundary and the eighth boundary are respectively greater than that of the second boundary and the fourth boundary, and calculating the change in the length of the fourth element comprises:

identifying the cross point of the fifth boundary and the eighth boundary as a first point, identifying the cross point of the fifth boundary and the sixth boundary as a second point, and identifying the cross point of the sixth boundary and the seventh boundary as a third point; and identifying two similar triangles from the sensing area according to a first line connecting the second point and the mark and a second line connecting the first point and the third point, and calculating the change in the length of the fourth element according to the proportional relationship between corresponding sides of the similar triangles.

24. The method of claim 23, further comprising: changing the sensing system from the second working mode to a third working mode so that the size of the sensing area changes from the second size to a larger third size, the lengths of two boundaries of the sensing area having the second size being equal to the lengths of two boundaries of the sensing area having the third size; and calculating the change in the length of the element corresponding to the other mark accordance with the other mark.

25. The method of claim 24, wherein when the changes in the lengths of the elements corresponding to the two marks are calculated, the sensing system redefines the size of the sensing area accordingly, so as to calculate the positional coordinates of a pointer by the redefined sensing area.

\* \* \* \* \*